INVENTOR.
JOHN P. REINHARDT
BY Felshin and Rosen
ATTORNEYS

Feb. 1, 1966   J. P. REINHARDT   3,231,913
APPARATUS FOR PULLING CABLE AND THREADING PIPE
Filed March 12, 1963   2 Sheets-Sheet 2

INVENTOR.
JOHN P. REINHARDT
BY Felshin and Rosen
ATTORNEYS

# United States Patent Office 3,231,913
Patented Feb. 1, 1966

3,231,913
APPARATUS FOR PULLING CABLE AND THREADING PIPE
John P. Reinhardt, Syosset, N.Y., assignor to American Baler Machines Co., Inc., Brooklyn, N.Y., a corporation of New York
Filed Mar. 12, 1963, Ser. No. 264,533
5 Claims. (Cl. 10—89)

This invention relates to apparatus for pulling cable and for threading pipe.

In the installation of electric cables in a building, for example, the electrician is required to cut and thread various lengths of conduit or pipe for the cable as well as pull various lengths of cable through the conduits. The work performed by the electrician is largely of a nature which requires individual or custom work and is therefore relatively slow and expensive. Obviously, apparatus which might reduce the expense of the operation fulfills an important need.

Accordingly, the primary object of the present invention is to provide improved apparatus for the pulling of cable and the threading of pipe.

The above and other objects, features and advantages of the invention will be more fully understood from the following description of the invention considered in connection with the accompanying drawings:

Figure 1:
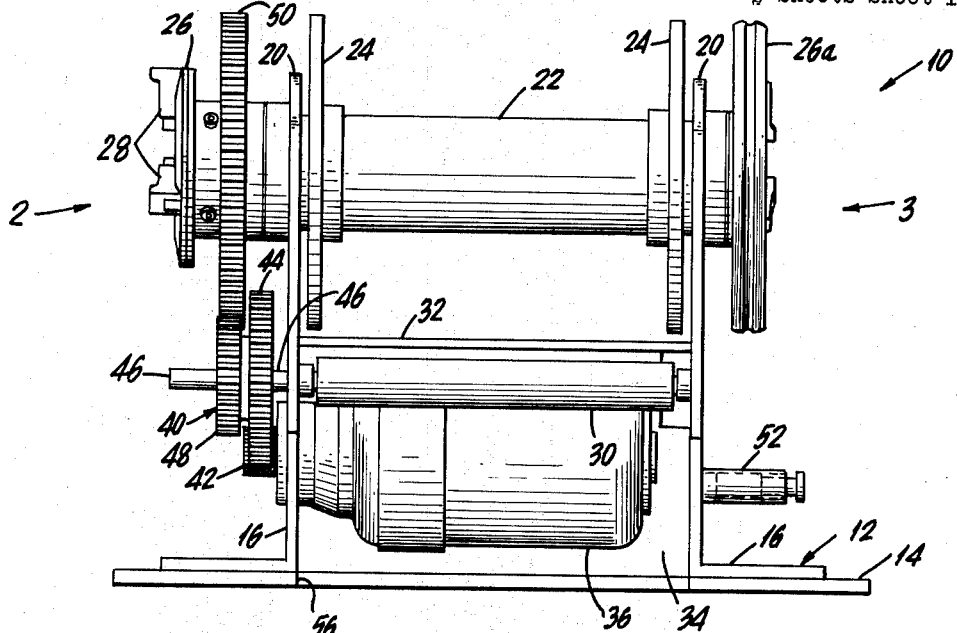
FIG. 1 is a side elevational view of an apparatus in accordance with the present invention.

Referring now to the drawings in detail, the apparatus 10 comprises a frame 12 having a horizontal support plate 14, a pair of longitudinally spaced laterally extending angle irons 16, and a pair of longitudinally spaced vertical supports 20. A horizontal hollow drum or tube 22 extends between the supports and is suitably journalled in the supports for rotation. A pair of longitudinally spaced outwardly extending flanges 24 are secured to the drum for rotation with the latter and are positioned between the supports adjacent the latter. The drum and flanges provide a reel for the cable and it will be understood that the cable is wound on the drum between the flanges.

The opposite ends of the drum extend from the companion support and the drum ends carry chucks 26 and 26a, respectively. The chucks are operative to support a pipe for the threading thereof and the pipe is adapted to extend longitudinally through the hollow drum. For this purpose the movable jaws 28 and 28a of the chucks hold the extending parts of the pipe in longitudinal axial alignment for the thread cutting operation.

Figure 2:
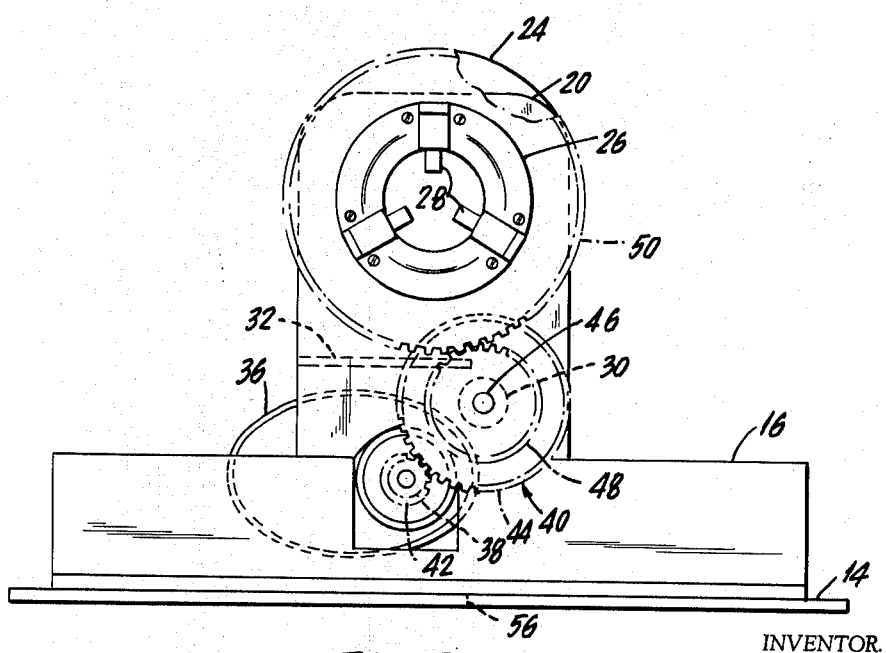
FIG. 2 is an end elevational view of the apparatus looking in the direction of arrow 2 of FIG. 1.
Figure 3:
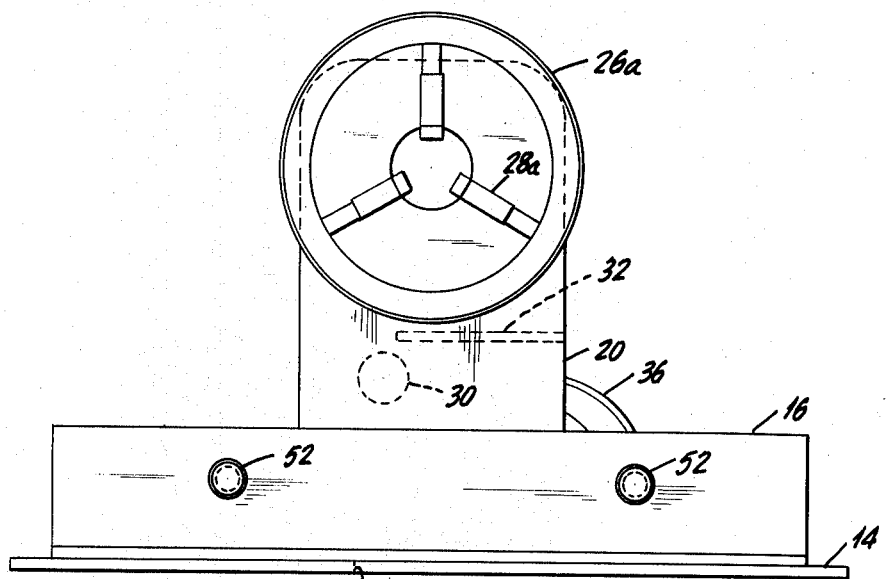
FIG. 3 is an end elevational view of the apparatus looking in the direction of arrow 3 of FIG. 1.

A cable-guide roller 30 extends longitudinally between supports 20 and is mounted for rotation on the latter in the manner hereinafter appearing. The roller has its longitudinal axis substantially parallel with the longitudinal axis of the drum and, as best seen in FIGS. 1 and 2, the roller is positioned below the drum and the axis of the roller is laterally offset from the axis of the drum.

It is to be noted that the drum is mounted toward the upper ends of the supports 20 and a horizontal brace 32 extends between the supports to define a lower compartment 34 which holds a motor 36 that is suitably secured to the frame. The drive shaft 38 of the motor is operatively connected to the drum via reduction gearing 40. The gearing includes a gear 42 mounted on the motor drive shaft and in mesh with a gear 44 which is suitably mounted on a shaft 46 supported by supports 20 and on which is mounted a gear 48 arranged to rotate with gear 44. Gear 48 is in mesh with a gear 50 which is secured to the companion extending end of the drum. One end of said shaft 46 projects beyond one of said supports 20, and it is such projecting portion of said shaft 46 which carries the gears 44, 48. Shaft 46 carries said roller 30.

A pair of laterally spaced telescoping arms or stops 52 extends from the side of angle iron 16 of the frame. Each stop 32 comprises a horizontal tube fixed to and projecting from angle iron 16, and a sliding rod telescoped therein and which may be pulled out to extend from the tube or pushed into or retracted into the tube. The stops are operative to engage the arms 54 (FIGS. 4 and 5) of the thread cutting tool 56. The pipe is identified by the letter P.

In the operation of the apparatus for pulling cable, the motor is operated to rotate the drum and the electrician holds the end of the cable. The rotation of the drum automatically unwinds the cable from the drum.

Figure 4:
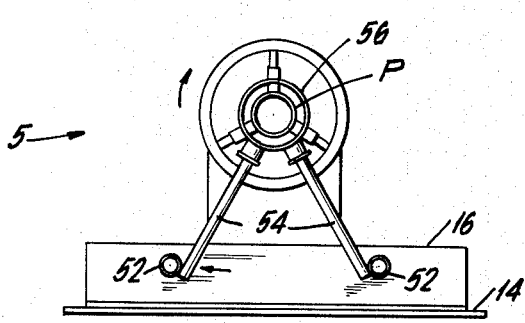
FIG. 4 is an end elevational view, similar to FIG. 3, showing a pipe threading tool in operative position.
Figure 5:
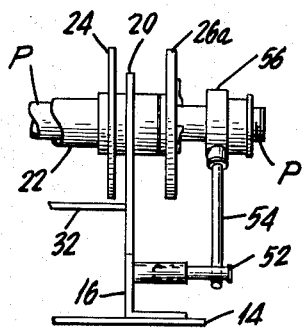
FIG. 5 is a side elevational view looking in the direction of arrow 5 of FIG. 4.

In the operation of the apparatus for threading the ends of pipe, the pipe is move longitudinally and endwise into the open end of the hollow drum until it extends beyond the opposite ends so that both protruding parts of the pipe can be gripped and held by the chucks in longitudinal axial alignment. The thread cutter 56 is then manually mounted on the end of the pipe which is to be threaded and the drum is operated. The cutter need not be held after the thread cutting operation has begun, since the cutter automatically mounts itself as it cuts the thread. The cutter is prevented from rotating with the drum by the stop 52 which is engaged by arm 54 and it is to be noted that two arms and two stops are provided to prevent rotation of the cutter in either direction. Arms 54 diverge downwardly and outwardly as shown in FIG. 4.

It is to be observed from the above description of the invention that the drum not only supports the cable but also supports the chucks which hold the pipe. It is also to be understood that the apparatus is of a size that readily permits portable use and movement from one place to another. The apparatus can be placed at different levels in the building and cable can be pulled to lower levels than the drum. For this purpose, roller 30 aids in the unreeling of the cable and prevents the cable from rubbing against parts of the apparatus as it is pulled down by the electrician who is below the drum. Plate 14 is provided with a cut-out 56a for the cable to pass through as it is pulled to lower levels.

It will now be understood that flanges 24 are located inside of supports 20 and reinforce the tube 22. The motor 36 has a drive shaft 38 parallel to axis of the tube. Said motor is disposed below the tube and is offset to one side of the tube. The fixed brace plate 32 which interconnects supports 20 is disposed between the tube and the motor and is also offset to the same side of the tube, and terminating short of a vertical plane tangent to the tube at the opposite side of the axis of said tube so that a cable wound on the tube can come down past the brace plate and motor. The cut out 56a has an edge also disposed short of said plane, whereby the cable can come down through said cut out to below plate 14. The cut out 56a extends to one side edge of said plate 14. The roller 30, it will be noted, is located above the cut out 56a.

There are two chucks one at each end of tube 22. The space between said flanges 24 is clear.

While I have shown and described a preferred embodiment of my invention, it is to be understood that the in-

I claim:
1. In combination, a frame comprising a pair of vertical spaced fixed parallel supports, a horizontal tube journalled on said supports and disposed therebetween and provided with a pair of outwardly extending annular flanges located adjacent the insides of said supports, with the space between said flanges clear of obstructions, an electric motor mounted on said frame, and means to drivingly connect said motor with said tube for rotating the latter, said motor being located below said tube and having a drive shaft parallel to said tube, said motor being offset from and clearing a vertical plane tangent to one side of the tube, and a brace plate interconnecting said vertical supports and disposed between said tube and motor and likewise being offset from and clearing said vertical plane, said frame comprising a horizontal base plate from which said supports extend upwardly and having a cutout between said supports and providing a clearance below said side of said tube and said cut-out extending to an edge of said base.

2. The combination of claim 1, and a roller supported on said vertical supports and therebetween and projecting into a space above said cutout.

3. The combination of claim 1, said connecting drive means comprising a gear on said motor drive shaft, and located outside of one of said supports, a shaft mounted on said supports and having a portion projecting beyond said one of said supports, a pair of gears on the projecting portion of said shaft, and connected to rotate together, one of said pair of gears meshing with said gear on the motor drive shaft, and a gear fixed on said tube, and meshing with the other of said pair of gears.

4. The combination of claim 3, and a roller on said supports mounted shaft and located between said supports, and projecting into space above said cutout.

5. The combination of claim 4, and means on the ends of said tube and located outside of said supports, for releasably gripping a pipe passing through said tube, axially of said tube for rotation with said tube.

References Cited by the Examiner
UNITED STATES PATENTS

| | | | |
|---|---|---|---|
| 1,295,412 | 2/1919 | Baines | 10—89 |
| 1,943,643 | 1/1934 | Vosper | 10—89 |
| 2,578,316 | 12/1951 | Pealer | 10—89 |
| 2,759,703 | 8/1956 | Holmes | 254—186 |
| 2,936,915 | 5/1960 | Marsh | 254—186 |
| 3,128,482 | 4/1964 | McConnell | 10—107 |

ANDREW R. JUHASZ, *Primary Examiner.*